US012352093B2

(12) United States Patent
Katayama

(10) Patent No.: US 12,352,093 B2
(45) Date of Patent: Jul. 8, 2025

(54) IN-VEHICLE VENTILATION SYSTEM

(71) Applicant: Yazaki Corporation, Tokyo (JP)

(72) Inventor: Kazutaka Katayama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 347 days.

(21) Appl. No.: 17/888,724

(22) Filed: Aug. 16, 2022

(65) Prior Publication Data

US 2023/0272662 A1    Aug. 31, 2023

(30) Foreign Application Priority Data

Aug. 19, 2021    (JP) .................................. 2021-134243

(51) Int. Cl.
*B60H 1/00* (2006.01)
*E05F 15/695* (2015.01)
*E05F 15/73* (2015.01)

(52) U.S. Cl.
CPC ......... *E05F 15/73* (2015.01); *B60H 1/00742* (2013.01); *E05F 15/695* (2015.01); *E05Y 2900/55* (2013.01)

(58) Field of Classification Search
CPC .... E05F 15/73; E05F 15/695; B60H 1/00742; E05Y 2900/55; F24F 11/00; F24F 11/62; F24F 11/74; F24F 2110/00; F24F 2120/00; F24F 2130/00; F24F 2140/00; F24F 2120/0012
USPC ...................................................... 454/121
See application file for complete search history.

(56) References Cited

U.S. PATENT DOCUMENTS

| 11,230,246 B1* | 1/2022 | Beach ............... B60R 21/01512 |
| 2018/0001734 A1* | 1/2018 | Faust ................. B60H 1/00842 |
| 2019/0077217 A1 | 3/2019 | Yu et al. |
| 2020/0198439 A1* | 6/2020 | Yu ...................... B60H 1/00985 |

FOREIGN PATENT DOCUMENTS

| JP | 2003-312253 A | 11/2003 |
| JP | 2005-47418 A | 2/2005 |
| JP | 3951981 B2 | 8/2007 |
| JP | 2018-131053 A | 8/2018 |
| KR | 2003-0039479 A | 5/2003 |
| WO | WO-2016029044 A1 * | 2/2016 ......... B60H 1/00064 |

OTHER PUBLICATIONS

Tanioku, Hiroshi, JP2003312253 Translation.pdf, "Window automatic opening and closing device", Nov. 2003, pp. 1-14.*

* cited by examiner

*Primary Examiner* — Michael G Hoang
*Assistant Examiner* — Ryan L Faulkner
(74) *Attorney, Agent, or Firm* — Sughrue Mion, PLLC

(57) ABSTRACT

An in-vehicle ventilation system includes a power window mechanism configured to open and close a window of a vehicle and a control unit configured to control the power window mechanism. The control unit is further configured to acquire a first environmental information representing an environment inside the vehicle and a second environmental information representing an environment outside the vehicle, automatically select, based on the first environmental information and the second environmental information, a specific ventilation adjustment mode suitable for at least one occupant of the vehicle out of a plurality of ventilation adjustment modes and control the power window mechanism according to the selected ventilation adjustment mode.

6 Claims, 9 Drawing Sheets

IN-VEHICLE VENTILATION SYSTEM

CROSS-REFERENCE TO RELATED APPLICATION

The present application claims priority to Japanese Patent Application No. 2021-134243 filed on Aug. 19, 2021, the entire content of which is incorporated herein by reference.

TECHNICAL FIELD

The presently disclosed subject matter relates to an in-vehicle ventilation system.

BACKGROUND

In a case of using a vehicle, the vehicle may travel with a window glass such as a door open for the purpose of cooling by replacing air in a vehicle compartment or introducing natural air. Recently, since it is necessary to prevent the spread of COVID-19, even while the vehicle is traveling, it is desirable to open the window glass and ventilate the vehicle compartment on a regular basis, for example, rather than adjusting the temperature with an air conditioner.

Since the vehicle is often mounted with a power window device, for example, an occupant operates a predetermined button and can thereby open the window glass of the vehicle to a fully open position or close the window glass to a fully closed position. In addition, it is also possible to open/close the window glass in a direction in which an opening degree increases or in a direction in which the opening degree decreases when the predetermined button is operated.

For example, an in-vehicle temperature control system according to the related technique is disclosed to efficiently and promptly lower an in-vehicle temperature and to prevent crime. That is, the in-vehicle temperature control system includes an opening and closing body drive device that opens and closes a window glass, an air conditioning device that adjusts an in-vehicle temperature according to a set temperature, and a remote controller that can output a control signal for cooling the air conditioning device from outside the vehicle. In addition, a vehicle ECU performs, based on the input of the control signal, a crime prevention outside air introduction process of driving the opening and closing body drive device such that the window glass alternates between an opening operation and a closing operation, when the in-vehicle temperature is at least higher than an outside air temperature (see, for example, JP 2018-131053A).

When the window is opened and ventilation is performed while the vehicle is traveling, an amount of wind blown into a region in the vehicle compartment changes greatly according to a difference in opening degree of the window and a difference in traveling speed. In addition, when the wind blowing into the vehicle compartment from an opening of the window is too strong, the occupant will feel uncomfortable, and conversely, when the wind is too weak, the occupant will feel hot.

Therefore, it is necessary to adjust the opening degree of the window such that an appropriate wind blows for the occupant. However, since a typical power window device mounted on the vehicle adjusts the opening degree only when the occupant presses a predetermined button, or moves the window to a fully open or fully closed position, it is difficult to adjust the opening degree to an appropriate level.

In addition, when a plurality of occupants are on the same vehicle, in a state where window glasses are open for ventilation, it is comfortable for occupants in some seat positions, but occupants in other seat positions may feel uncomfortable with the wind blowing. That is, even when the opening degrees of the windows are the same, the strength of the wind flowing into seat positions varies greatly from location to location, making it difficult for all the occupants to feel comfortable. Therefore, when a specific occupant who operates the button adjusts the opening degree of the window to a wind amount that is comfortable for him/her, other occupants will feel uncomfortable.

In particular, in a usage environment where an unspecified number of users board the same vehicle due to the spread of shared cars, it is also important to open the window of the vehicle for ventilation. However, when some occupants manually adjust the opening degree of the window by operating a button, there is a concern that trouble may occur with other occupants who feel uncomfortable.

SUMMARY

Illustrative aspects of the presently disclosed subject matter provide an in-vehicle ventilation system that eliminates a need for manual adjustment and prevents an occupant from feeling uncomfortable in a case of ventilation by adjusting an opening degree of a window while a vehicle is traveling.

According to an illustrative aspect of the presently disclosed subject matter, an in-vehicle ventilation system includes a power window mechanism configured to open and close a window of a vehicle and a control unit configured to control the power window mechanism. The control unit is further configured to acquire a first environmental information representing an environment inside the vehicle and a second environmental information representing an environment outside the vehicle, automatically select, based on the first environmental information and the second environmental information, a specific ventilation adjustment mode suitable for at least one occupant of the vehicle out of a plurality of ventilation adjustment modes and control the power window mechanism according to the selected ventilation adjustment mode.

According to the in-vehicle ventilation system of the presently disclosed subject matter, since the control unit automatically controls the power window mechanism, ventilation can be performed by adjusting the opening degree of the window without the need for the occupant to perform a manual adjustment operation in situations such as while the vehicle is traveling. Moreover, since the ventilation adjustment mode is automatically selected based on the first environmental information and the second environmental information, it is possible to prevent the occupant from feeling uncomfortable.

Other aspects and advantages of the presently disclosed subject matter will be apparent from the following description, the drawings and the claims.

DESCRIPTION OF EMBODIMENTS

A specific embodiment related to the presently disclosed subject matter will be described below with reference to the drawings.

Figure 1:
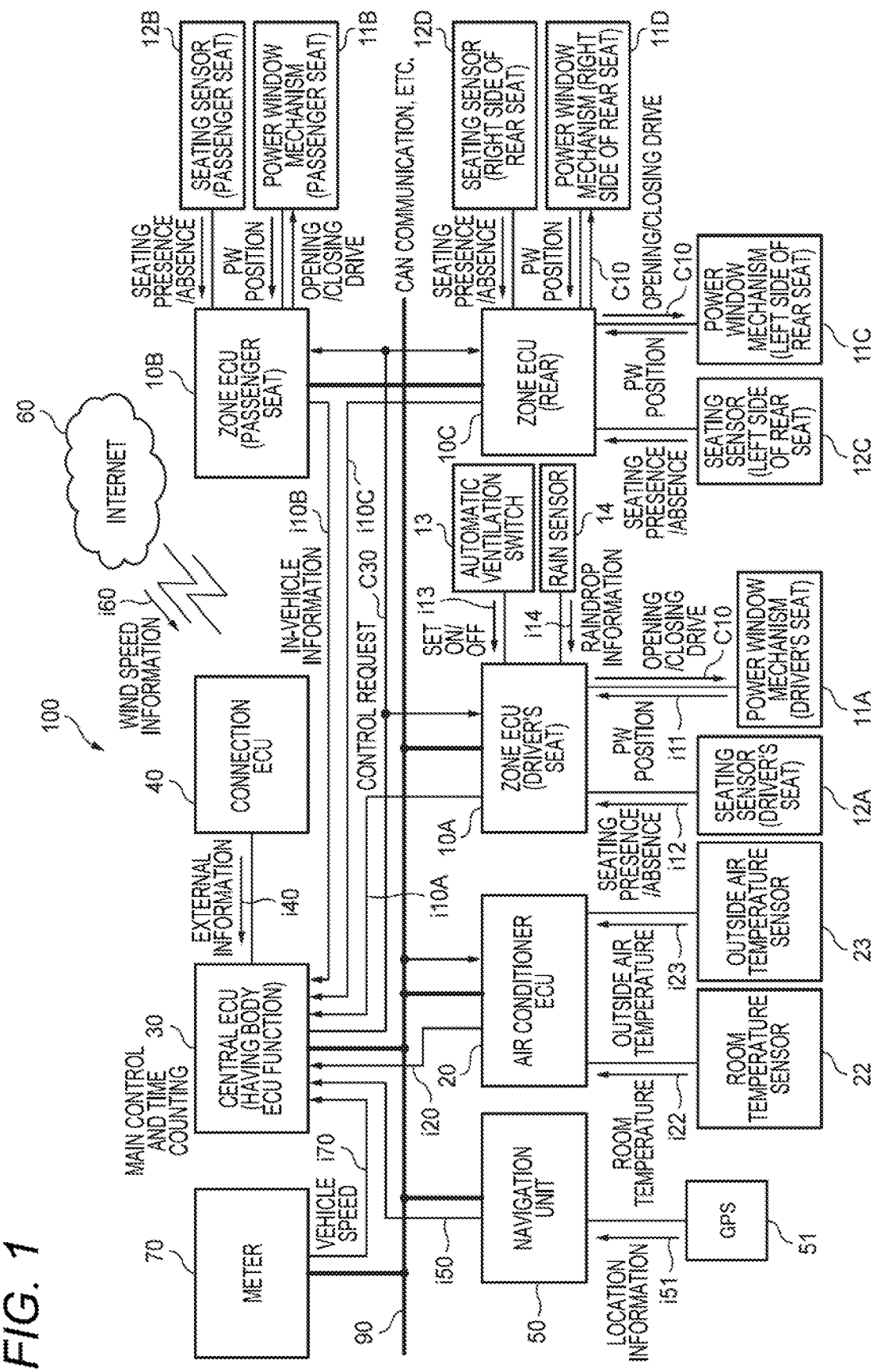
FIG. 1 is a block diagram showing a configuration of an in-vehicle ventilation system according to an embodiment of the presently disclosed subject matter.

FIG. 1 is a block diagram showing a configuration of an in-vehicle ventilation system 100 according to an embodiment of the presently disclosed subject matter.

The in-vehicle ventilation system 100 shown in FIG. 1 is to be mounted on a vehicle, and includes a plurality of zone ECUs 10A, 10B, and 10C, an air conditioner ECU 20, a central ECU 30, a connection ECU 40, a navigation unit 50 and a meter unit 70 as main control units.

The zone ECUs 10A, 10B, and 10C, the air conditioner ECU 20, the central ECU 30, the navigation unit 50, and the meter unit 70 are connected to each other via an in-vehicle communication bus 90 so as to be able to communicate with each other. The in-vehicle communication bus 90 provides a transmission line for wired communication corresponding to a vehicle communication standard such as a controller area network (CAN).

The zone ECUs 10A, 10B, and 10C, shown in FIG. 1 each have a function of managing opening/closing of a window glass of each vehicle door for ventilation in a vehicle compartment. In addition, the zone ECUs 10A, 10B, and 10C have a function of respectively managing a region near a driver's seat, a region near a passenger seat, and a region near a rear seat (rear region). Actually, a computer built in each of the zone ECUs 10A, 10B, and 10C executes a predetermined program to execute a process according to a situation.

A power window mechanism 11A, a seating sensor 12A, an automatic ventilation switch 13, and a rain sensor 14 are connected to the zone ECU 10A.

The power window mechanism 11A is mounted in a door on a driver's seat side. In addition, the power window mechanism 11A can raise and lower a window glass of the door by a drive force of an electric motor provided in the door on the driver's seat side to form an opening for ventilation or close the opening.

In addition, the power window mechanism 11A includes a built-in position sensor (not shown) that outputs window position (PW position) information i11 corresponding to an opening degree of the window glass. When the zone ECU 10A outputs a predetermined opening/closing control signal C10, opening/closing drive for the power window mechanism 11A can be made.

The seating sensor 12A detects whether an occupant has been seated in the driver's seat and outputs seating presence/absence information i12. The automatic ventilation switch 13 is a switch that can be turned ON and OFF by the occupant such a driver by operating a button or the like. A function for outputting switch information i13 for switching ON/OFF of automatic ventilation is assigned to the automatic ventilation switch 13.

The rain sensor 14 can detect, by an optical sensor, raindrops adhering to, for example, a specific region on an upper part of a front windshield (window glass) of the own vehicle and output raindrop information i14 indicating the detected state.

The power window mechanism 11B and the seating sensor 12B at the passenger seat are connected to the zone ECU 10B. The power window mechanism 11B is mounted in a door on a passenger seat side, and, similar to the power window mechanism 11A at the driver's seat, can raise and lower a window glass of the door by the drive force of the electric motor to form an opening for ventilation or close the opening.

In addition, window position information corresponding to an opening degree of the window glass at the passenger seat door is output from the power window mechanism 11B and input to the zone ECU 10B. When the zone ECU 10B outputs a predetermined opening/closing control signal, opening/closing drive for the power window mechanism 11B can be made. The seating sensor 12B detects whether an occupant has been seated in the passenger seat and outputs seating presence/absence information.

Power window mechanisms 11C and 11D and seating sensors 12C and 12D are connected to the zone ECU 10C. The power window mechanisms 11C and 11D are installed in a rear seat left door and a rear seat right door, respectively. Similar to the power window mechanism 11A, the power window mechanisms 11C and 11D can raise and lower a window glass of the corresponding door by the drive force of the electric motor to form an opening for ventilation or close the opening. In addition, the power window mechanisms 11C and 11D output window position information corresponding to the opening degree of the window glass of the corresponding door.

The seating sensors 12C and 12D detect whether the occupant is seated at a predetermined position on a left side of the rear seat and a predetermined position on a right side of the rear seat, respectively, and output information indicating whether the occupant is seated.

The zone ECU 10A can transmit in-vehicle information i10A including the window position information i11, the seating presence/absence information i12 for the drivers seat, the switch information i13, and the raindrop information i14 to the central ECU 30 via the in-vehicle communication bus 90.

The zone ECU 10B can transmit in-vehicle information i10B including the window position information for the passenger seat and the seating presence/absence information for the passenger seat to the central ECU 30 via the in-vehicle communication bus 90. The zone ECU 10C can transmit in-vehicle information i10C including the window position information for the left side of the rear seat, the seating presence/absence information for the left side of the rear seat, the window position information for the right side of the rear seat, and the seating presence/absence information for the right side of the rear seat to the central ECU 30 via the in-vehicle communication bus 90.

The zone ECU 10A can control the power window mechanism 11A at the driver's seat door according to a control request C30 transmitted from the central ECU 30. The zone ECU 10B can control the power window mechanism 11B at the passenger seat door according to the control request C30. The rear seat zone ECUs 10C and 10D can respectively control the power window mechanisms 11C and 11D at the rear seat left door and the rear seat right door according to the control request C30.

The air conditioner ECU 20 includes a built-in computer having a function of controlling an air conditioning device (air conditioner) mounted on the vehicle. As shown in FIG. 1, a room temperature sensor 22, and an outside air temperature sensor 23 are connected to the air conditioner ECU 20.

The room temperature sensor 22 is composed of a sensor such as a thermistor installed in the vehicle compartment, and can output room temperature information i22 indicating a detected temperature in the vehicle compartment. The outside air temperature sensor 23 is a temperature sensor installed at a part that can come into contact with the outside air, and can output outside air temperature information i23 indicating a detected temperature.

The air conditioner ECU 20 can transmit in-vehicle information i20 including the room temperature information i22 and the outside air temperature information i23 to the central ECU 30 via the in-vehicle communication bus 90.

The central ECU 30 is a control unit located hierarchically above the zone ECUs 10A, 10B, and 10C, the air conditioner ECU 20, the navigation unit 50, and the meter unit 70 in terms of functions of the vehicle as a whole, and includes a built-in computer that performs main control and a time counting process for implementing functions of the in-vehicle ventilation system 100. Further, the central ECU 30 has a function of a body ECU of this vehicle.

The central ECU 30 can acquire the in-vehicle information i10A, i10B, i10C, and i20, location information i50, and vehicle speed information i70 from the ECUs via the in-vehicle communication bus 90. Further, external information i40 can be acquired from the connection ECU 40. Based on these pieces of information, the central ECU 30 grasps the situation and generates the control request C30. This control request C30 is transmitted to the zone ECUs 10A, 10B, and 10C via the in-vehicle communication bus 90. Accordingly, appropriate automatic ventilation control can be performed as described later.

The connection ECU 40 is mounted with a predetermined wireless communication module, and can always connect a wireless communication line between the vehicle and an Internet 60. Therefore, the connection ECU 40 can acquire various pieces of information required on the vehicle from the Internet 60.

In the present embodiment, the connection ECU 40 can acquire, from the Internet 60, wind speed information i60 at a region near a current location of the own vehicle. The wind speed information i60 can be acquired from a predetermined server on the Internet 60 as information provided by an administrative agency that manages weather information in each region or by various companies. The wind speed information i60 may be an actual observed value or a predicted value.

Similar to a typical car navigation device, the navigation unit 50 has a function of constantly grasping the current location of the own vehicle and guiding driving along a movement route to a destination based on predetermined road map information. A global positioning system (GPS) unit 51 is connected to the navigation unit 50 in order to calculate information on the current location of the own vehicle.

The GPS unit 51 can calculate a latitude/longitude representing the current location of the own vehicle based on times when radio waves are received from a plurality of GPS satellites. The navigation unit 50 can transmit the location information i50 to the central ECU 30 via the in-vehicle communication bus 90 based on location information i51 calculated by the GPS unit 51.

The meter unit 70 repeatedly acquires and manages information on various vehicles required by the driver when driving in a short cycle, such as a current traveling speed (vehicle speed) [km/h], an engine rotation speed, a cooling water temperature, and a remaining fuel amount of the own vehicle. The meter unit 70 can transmit the vehicle speed information i70 to the central ECU 30 via the in-vehicle communication bus 90 on a regular basis, for example.

When an automatic ventilation function is turned ON by the automatic ventilation switch 13, the central ECU 30 shown in FIG. 1 automatically grasps the situation and automatically controls the power windows of the doors such that ventilation can be performed by opening the windows in a comfortable environment for all occupants in this vehicle.

Specifically, at least the following three types of situations, "A", "B", and "C", are identified:
"A": a situation where the occupant can feel comfortable while exposed to the wind directly from the window;
"B": an outside air temperature situation where the occupant can feel uncomfortable while exposed to the wind directly from the window; and
"C": a situation where there is a risk of strong wind entering the vehicle compartment when opening the window.

When a plurality of the above "A", "B", and "C" situations occur at the same time, the priority of control is set to "C>B>A". In actual ventilation control, considering the difference in seating position and the number of occupants actually on the vehicle, the above "A", "B", and "C" are further classified to identify six types of situations, "A1", "A2", "B1", "B2", "B3", and "C". In addition, five types of ventilation modes M1 to M5 can be selected according to the situation.

Figure 2:
FIG. 2 is a schematic diagram showing a configuration example of a ventilation mode table for use in the in-vehicle ventilation system.

FIG. 2 is a schematic diagram showing a configuration example of a ventilation mode table T01 for use in the in-vehicle ventilation system.

In the ventilation mode table T01 shown in FIG. 2, an occupant situation C00 is classified into six types, "A1", "A2", "B1", "B2", "B3", and "C".

In the ventilation mode table T01, the occupant situation C00 "A1" indicates that the occupant is only the driver and the situation corresponds to the above "A". The occupant situation C00 "A2" indicates that there are a plurality of occupants and the situation corresponds to the above "A".

The occupant situation C00 "B1" indicates that the occupant is only the driver and the situation corresponds to the above "B". The occupant situation C00 "B2" indicates that there are one or more vacant seats and the situation corresponds to the above "B". The occupant situation C00 "B3" indicates that all seats are occupied by the occupants and the situation corresponds to the above "B".

In the ventilation mode table T01 shown in FIG. 2, ventilation modes Mx, i.e., M1, M2, M3, M4, M5, and M5 respectively are assigned to the occupant situations C00, i.e., "A1", "A2", "B1", "B2", "B3", and "C".

The ventilation mode M1 has a function of widely opening the window on the driver's seat side and the window on a diagonal position (left side of the rear seat) for ventilation. The ventilation mode M2 has a function of widely opening the windows on seating positions sides for all occupants for ventilation. The ventilation mode M3 has a function of opening, at a half opening degree, the window on the passenger seat side and the window on a diagonal position (right side of the rear seat) for ventilation. The ventilation mode M4 has a function of opening, at a half opening degree, windows on all seat sides for ventilation. The ventilation mode M5 has a function of slightly opening all the windows for ventilation.

Figure 3:
FIG. 3 is a schematic diagram showing a configuration example of a situation determination table for use in the in-vehicle ventilation system.

FIG. 3 is a schematic diagram showing a configuration example of a situation determination table T02 for use in the in-vehicle ventilation system.

The situation determination table T02 shows a specific standard for determining whether each of the above three types of situations "A", "B", and "C" is applicable. That is, conditions corresponding to each of the situations "A", "B", and "C" are as follows:

"A": a case where any of the following conditions Aa, Ab, and Ac is satisfied: Aa. the outside air temperature is within a certain range, for example, in a range of 20° C. to 28° C., hysteresis ±2° C.; Ab. the vehicle speed is less than a certain value, for example, less than 70 km/h, hysteresis ±10 km/h; and Ac. the wind speed of the outside air at the current location is less than a certain level;

"B": the outside air temperature is outside a certain range, for example, 20° C. or lower or 28° C. or higher: and "C": a case where either of the following Ca or Cb conditions is satisfied: Ca. traveling at a high speed, for example, the vehicle speed is 70 km/h or more; and Cb. the wind speed of the outside air at the current location is equal to or higher than a certain level.

Key information Used by In-vehicle Ventilation System for Control are as follows:

(1) Vehicle speed information i70: can be acquired from the meter unit 70;
(2) Seating position and number of occupants: can be grasped based on the seating presence/absence information i12 output from the seating sensor 12A to 12D or an image of a camera that captures the vehicle compartment;
(3) Outside air temperature: can be acquired from the air conditioner ECU 20;
(4) Current location of the own vehicle: the location information i51 output by the GPS unit 51 can be used; and
(5) Wind speed at current location: can be acquired from the Internet using location information and the connection ECU 40.

FIGS. 4 to 9 are flowcharts each showing a main operation for the in-vehicle ventilation system 100 to implement the automatic ventilation function. In the present embodiment, the central ECU 30 plays a central role in performing this control. Of course, the zone ECU 10A or the like may be used for control instead of the central ECU 30. The operations in FIGS. 4 to 9 will be described below.

The operations in FIGS. 4 to 9 are repeatedly performed by the central ECU 30, for example, at a regular interval. The central ECU 30 grasps a state of the switch information i13 corresponding to an operation of the automatic ventilation switch 13 in S11 of FIG. 4, and identifies ON/OFF of automatic ventilation setting.

Figure 5:
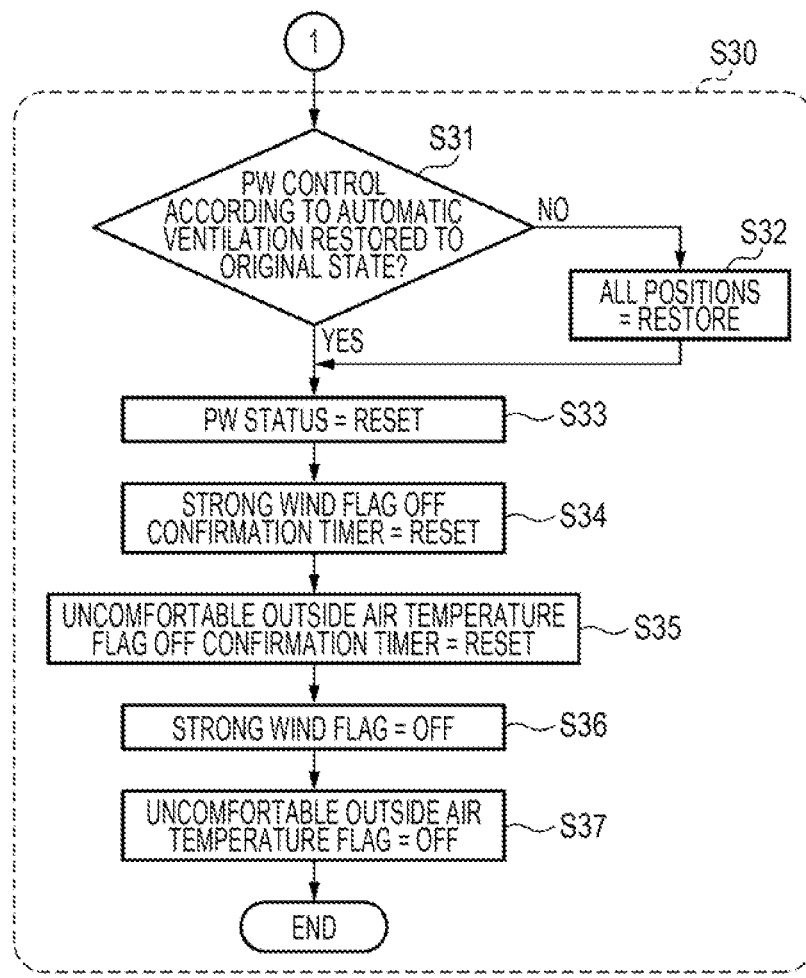
FIG. 5 is a flowchart showing a main operation-2 of the in-vehicle ventilation system.

When the automatic ventilation setting is OFF, the central ECU 30 initializes, in S30 of FIG. 5, various flags to be used in the automatic ventilation control. That is, when PW (power window) control according to automatic ventilation has not been restored to the original state, the process proceeds from S31 to S32 to restore all PW positions to positions before the automatic ventilation control. In addition, the central ECU 30 resets a PW status (S33), resets a strong wind flag OFF confirmation timer (S34), resets an uncomfortable outside air temperature flag OFF confirmation timer (S35), turns OFF a strong wind flag (S36), and turns OFF an uncomfortable outside air temperature flag (S37).

Figure 4:
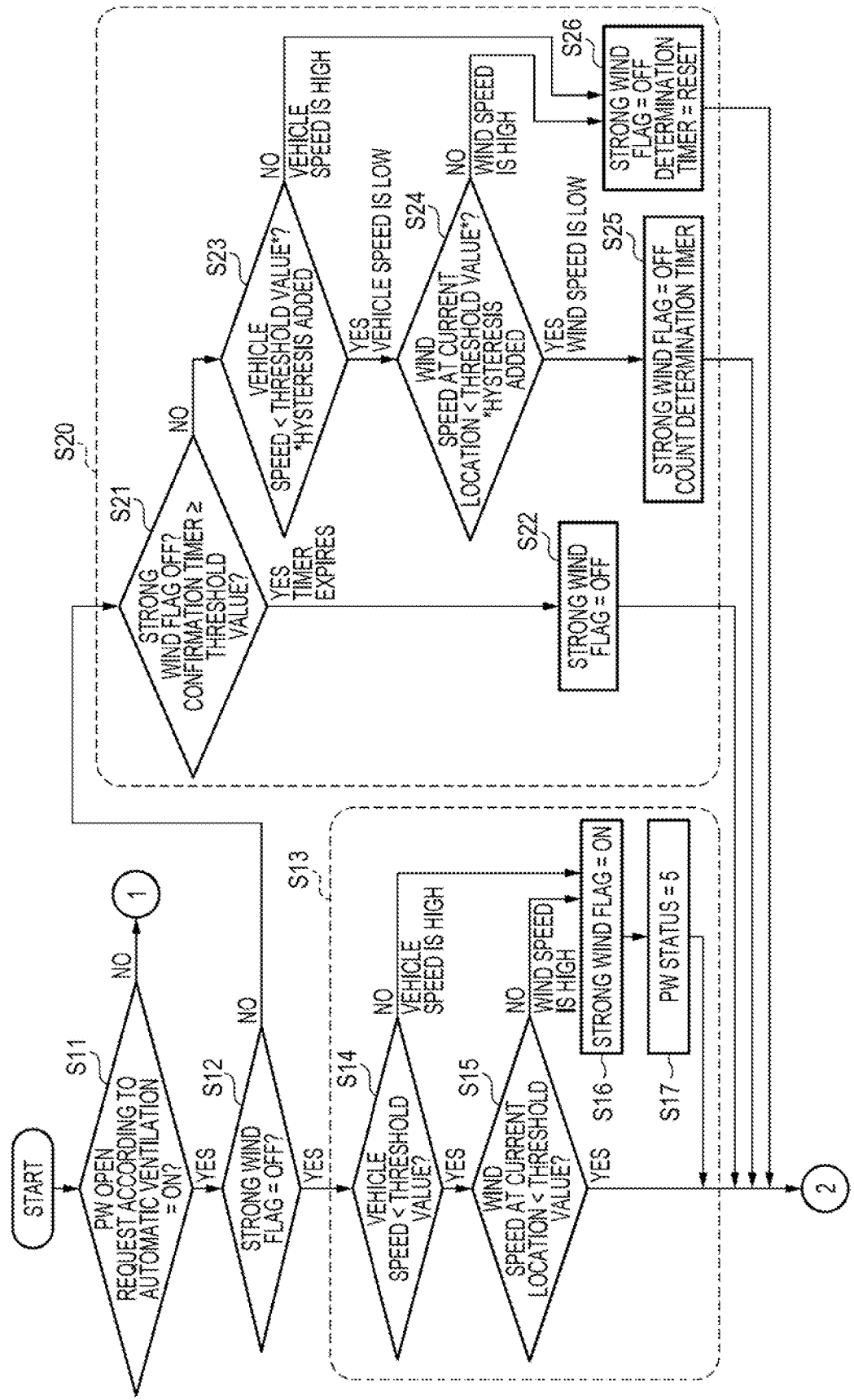
FIG. 4 is a flowchart showing a main operation-1 of the in-vehicle ventilation system.

The central ECU 30 confirms the state of the strong wind flag in S12 of FIG. 4, executes a process of S13 next when the strong wind flag is OFF, and executes a process of S20 when the strong wind flag is not OFF.

In the case of executing the process of S13, the central ECU 30 determines whether "vehicle speed<threshold value" in S14 and "wind speed at current location<threshold value" in S15. Then, when the vehicle speed is high or the wind speed is high, the strong wind flag is turned ON (S16) and the PW status is set to "5" (S17). That is, in a case where strong wind is likely to enter the vehicle when the window is open, a flag is set in the process of S13 to reduce an amount of opening the window.

On the other hand, in the case of executing the process of S20, the central ECU 30 determines whether "strong wind flag OFF confirmation timer≥threshold value" in S21, and when the timer expires, turns OFF the strong wind flag in S22 next. When the timer has not expired, the central ECU 30 executes comparison in S23 and S24.

That is, in S23, whether "vehicle speed<threshold value" is determined. A predetermined hysteresis is added to the threshold value of S23 to stabilize the control. In S24, whether "wind speed at current location<threshold value" is determined. A predetermined hysteresis is added to the threshold value of S24 to stabilize the control.

When the vehicle speed is low and the wind speed is also low, the central ECU 34) counts the strong wind flag OFF confirmation timer (S25). Further, when the vehicle speed is high or the wind speed is high, the central ECU 30 resets the strong wind flag OFF confirmation timer (S26).

That is, the central ECU 30 controls the strong wind flag in the process of S20. When the vehicle speed or the wind speed continuously falls below the strong wind threshold value including the hysteresis for a certain time, the strong wind flag is released.

Figure 6:
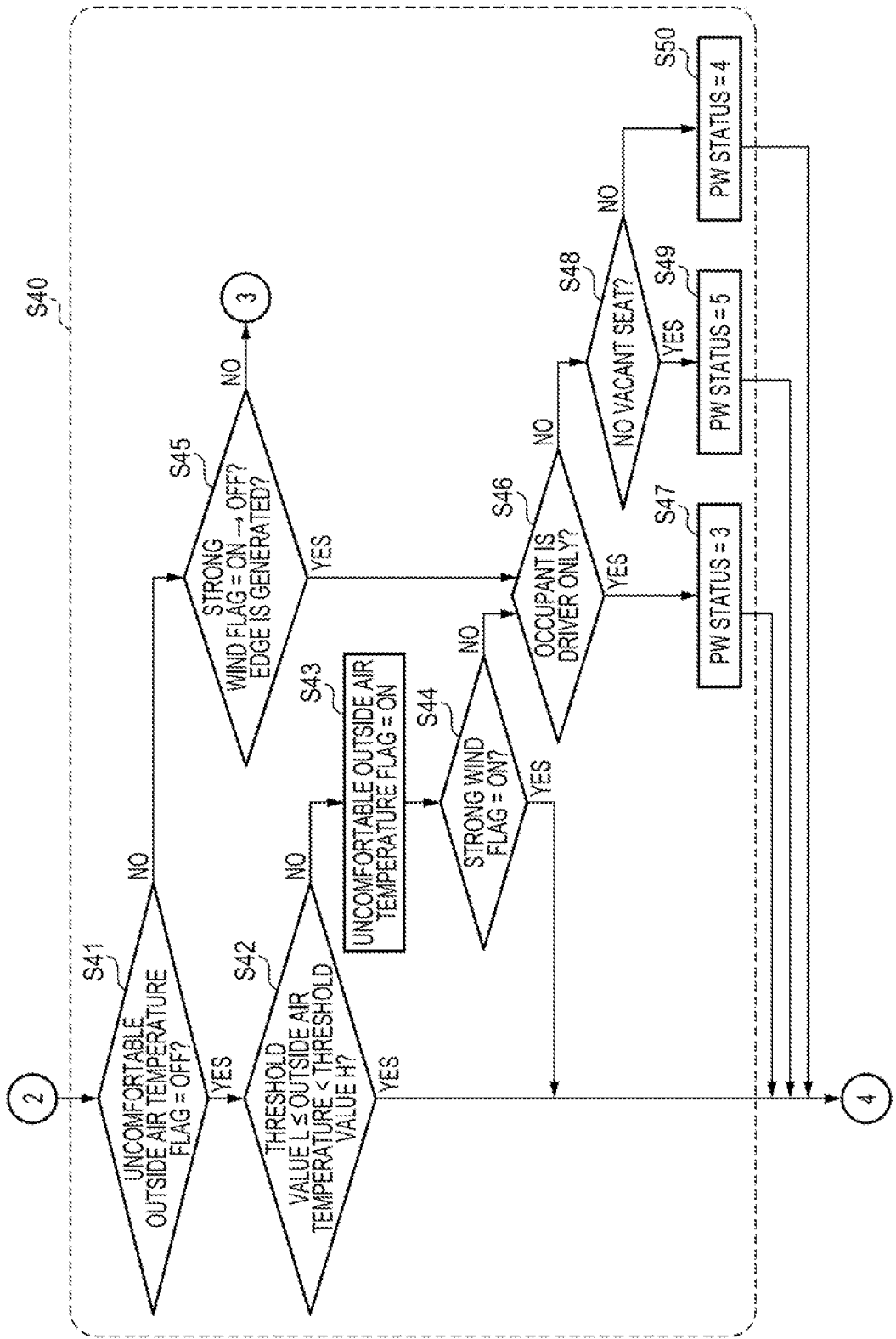
FIG. 6 is a flowchart showing a main operation-3 of the in-vehicle ventilation system.

In a process of S40 shown in FIG. 6, in a case where wind with an unpleasant temperature is likely to enter the vehicle when the window is open, the central ECU 30 performs a process for setting a flag for appropriately adjusting the position of the window to be opened and the opening degree of the window.

When the uncomfortable outside air temperature flag is OFF, the central ECU 30 proceeds from S41 to S42 and determines whether "threshold value≤outside air temperature<threshold value H". Here, the "threshold value L" is the lower limit value of the range, and the "threshold value H" is the upper limit value of the range.

Then, when the outside of the vehicle is hot or the outside of the vehicle is cold, the uncomfortable outside air temperature flag is turned ON in S43. Since the strong wind flag is prioritized over the uncomfortable outside air temperature flag, when the strong wind flag is ON in S44, a process same as in a case where the outside of the vehicle is at an appropriate temperature is performed.

On the other hand, when the uncomfortable outside air temperature flag is not OFF, the central ECU 30 performs comparison of S45. That is, in S45, it is confirmed whether an edge is generated, which means that the state of the strong wind flag has changed from ON to OFF. When the edge is generated, the process proceeds to S46, and when no edge is generated, the process proceeds to S60 in FIG. 7.

When the strong wind flag is turned OFF while the uncomfortable outside air temperature flag is set (ON), the central ECU 30 proceeds to a process of S46 and grasps the state of the occupant on the vehicle in order to appropriately change the window position where only one routine window is open.

Then, when the occupant is only the driver, the process proceeds from S46 to S47, and the central ECU 30 sets the PW status to "3". When there is no vacant seat and the seats are all occupied, the process proceeds from S48 to S49 and the PW status is set to "5". When there are a plurality of occupants and there are vacant seats, the process proceeds from S48 to S50 and the PW status is set to "4".

Figure 7:
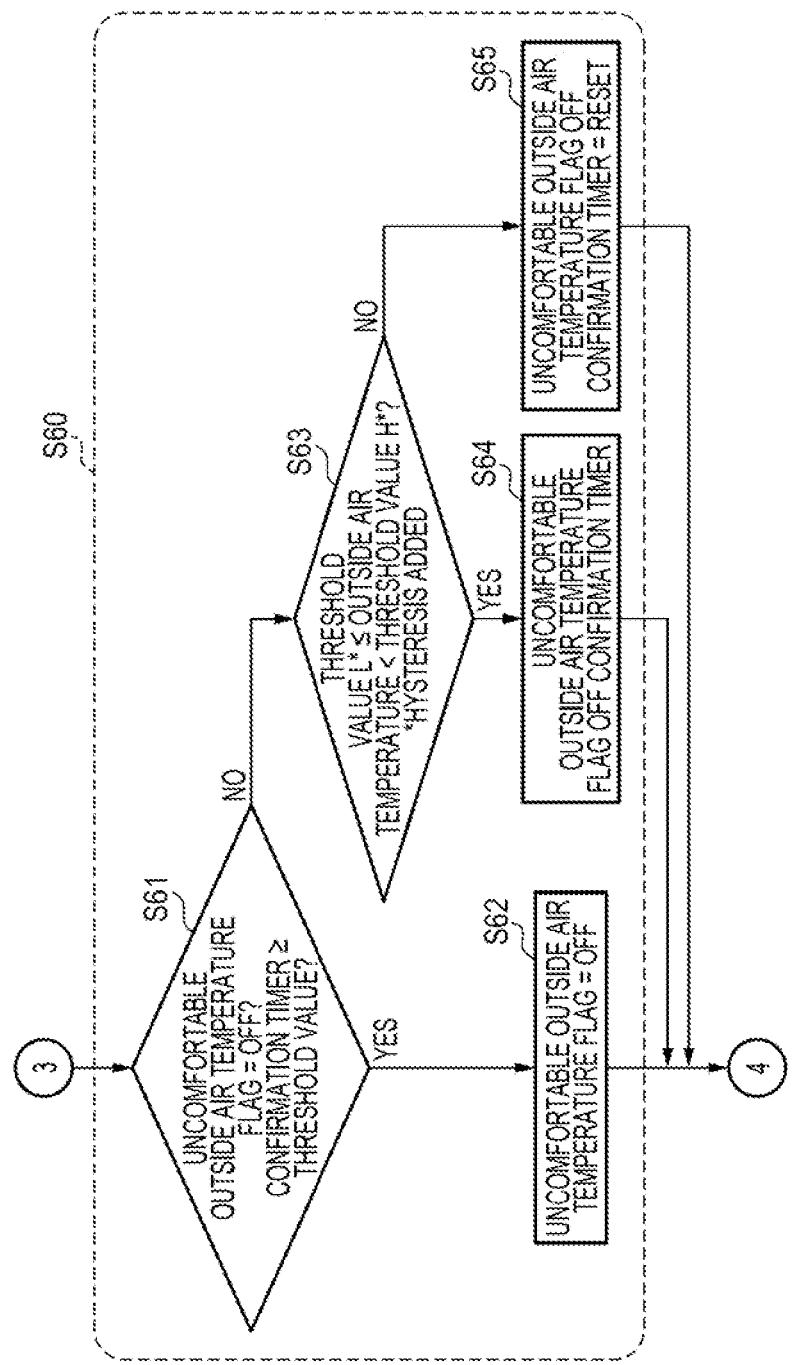
FIG. 7 is a flowchart showing a main operation-4 of the in-vehicle ventilation system.

In the process of S60 in FIG. 7, the central ECU 30 appropriately controls the uncomfortable outside air temperature flag. That is, when the outside air temperature reaches an appropriate temperature continuously for a certain time, the uncomfortable outside air temperature flag is released.

In S61, the central ECU 30 compares the value of the uncomfortable outside air temperature flag OFF confirmation timer with a threshold value. When the condition of S61 is satisfied, the uncomfortable outside air temperature flag is turned OFF in S62 next. When the condition of S61 is not satisfied, comparison in S63 is performed.

In S63, the central ECU 30 determines whether "threshold value L≤outside air temperature<threshold value H". Here, the "threshold value L" is the lower limit value of the outside air temperature, and the "threshold value H" is the upper limit value of the outside air temperature, both of which are values in which a predetermined hysteresis is added.

Then, when the outside air temperature is within an appropriate temperature range, the central ECU 30 counts the uncomfortable outside air temperature flag OFF confirmation timer in S64. Further, when the outside air temperature is hot or cold, the process proceeds to S65 to reset the uncomfortable outside air temperature flag OFF confirmation timer.

Figure 8:
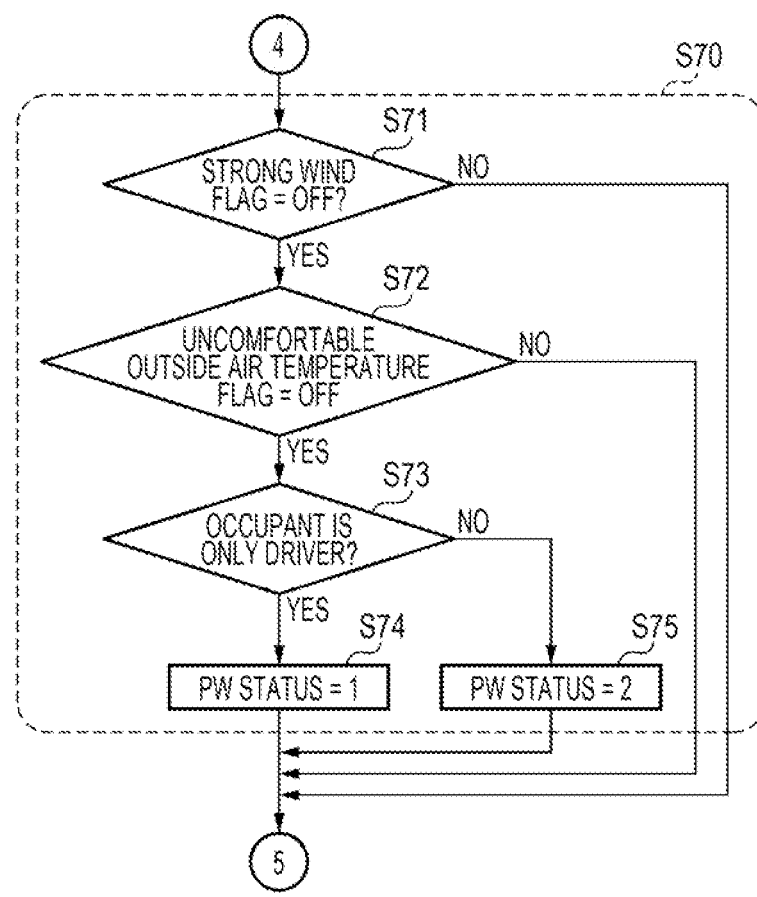
FIG. 8 is a flowchart showing a main operation-5 of the in-vehicle ventilation system.

A process of S70 shown in FIG. 8 has a function of setting a flag for opening a window near which an occupant is located when there is no strong wind and the temperature outside the vehicle is appropriate. That is, the central ECU 30 confirms the state of the strong wind flag in S71, confirms the uncomfortable outside air temperature flag in S72, and confirms whether the occupant is only the driver in S73.

Then, when the strong wind flag is OFF, the uncomfortable outside air temperature flag is OFF, and the occupant is only the driver, the central ECU 30 sets the PW status to "1" in S74. When the occupant is other than the driver, the central ECU 30 sets the PW status to "2" in S75.

Figure 9:
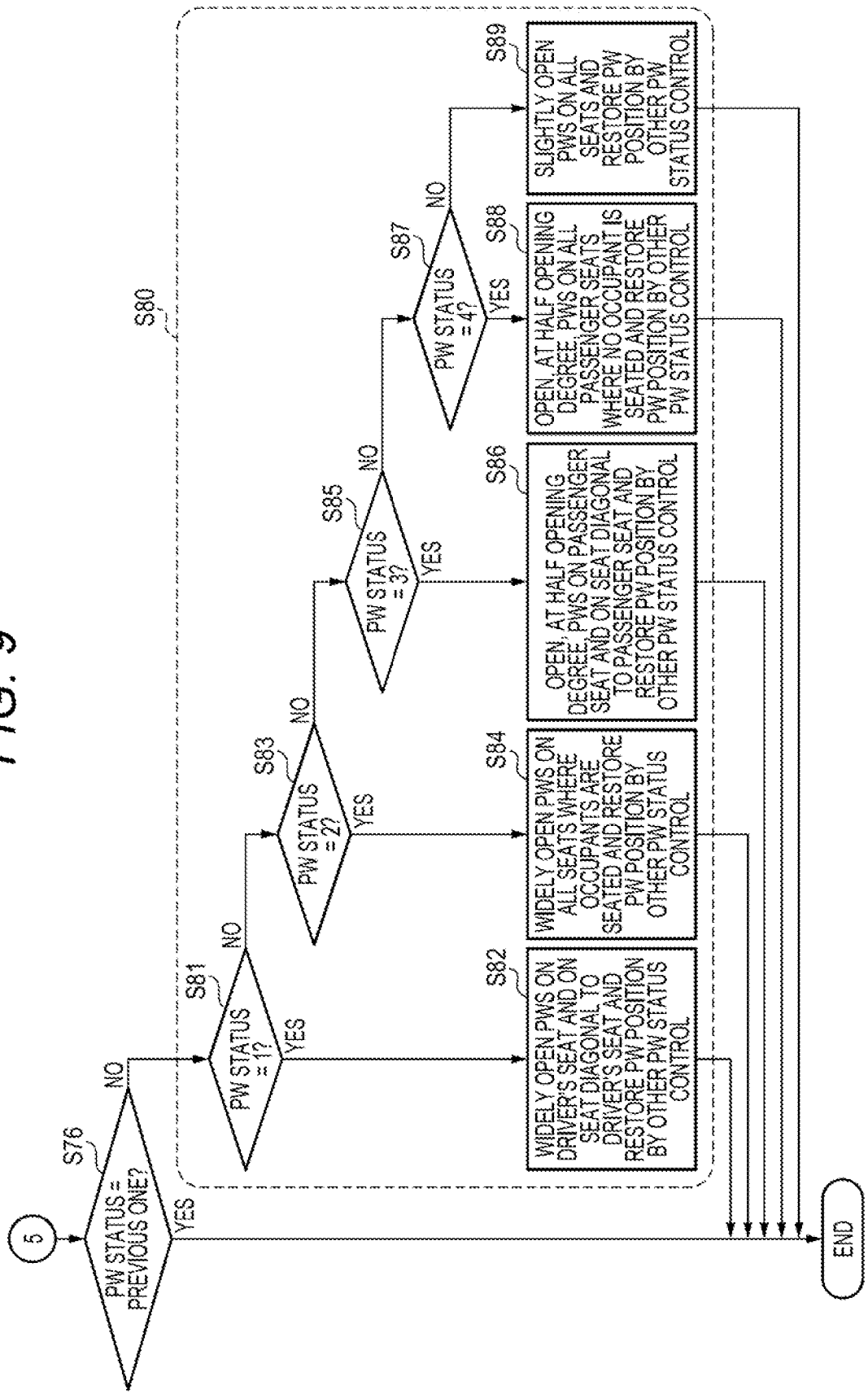
FIG. 9 is a flowchart showing a main operation-6 of the in-vehicle ventilation system.

A process of S80 shown in FIG. 9 has a function of performing appropriate power window control according to the state of each flag. The central ECU 30 identifies in S76 of FIG. 9 whether the PW status has the same value as the previous process, and when the value of the PW status changes, proceeds to the process of S80.

Then, when the value of the PW status is "1", the process proceeds from S81 to 82, when the value of the PW status is "2", the process proceeds from S83 to 84, when the value of the PW status is "3", the process proceeds from S85 to 86, when the value of the PW status is "4", the process proceeds from S87 to 88, and when the value of the PW status is "5", the process proceeds to 89.

In S82, the central ECU 30 controls the PW so as to widely open windows at the driver's seat position and at the seat position diagonal to the driver's seat position while restoring the PW position by other PW status control.

In S84, the central ECU 30 controls the PW so as to widely open windows on all seat positions where the occupants are seated while restoring the PW position by other PW status control.

In S86, the central ECU 30 controls the PW so as to open, at a half opening degree, windows at the passenger seat position and at the seat position diagonal to the passenger seat position while restoring the PW position by other PW status control.

In S88, the central ECU 30 controls the PW so as to open, at a half opening degree, windows on all seat positions where no occupant is seated while restoring the PW position by other PW status control.

In S89, the central ECU 30 controls the PW so as to slightly open (for example, 10% of full open) windows of all seat positions while restoring the PW position by other PW status control.

As above, according to the in-vehicle ventilation system 100 of the present embodiment, when the automatic ventilation setting is turned ON by the automatic ventilation switch 13, the central ECU 30 automatically switches the ventilation modes M1 to M5 (see FIG. 2) to perform appropriate ventilation according to the situation, so that a manual operation for ventilation is no longer necessary. Moreover, since a switch operation is not required, ventilation can be made not only for the comfort of a specific occupant who desires ventilation such as a driver, but also for the feelings of other occupants.

In the case of using the ventilation mode table T01 shown in FIG. 2, since the difference in the opening degree of the window can be properly used by selecting the plurality of ventilation modes M1 to M5, it is easy to appropriately adjust the ventilation strength and the strength of wind exposed to the occupants as necessary.

In the case of using the ventilation mode table T01 shown in FIG. 2, since the plurality of ventilation modes M1 to M5 can be selected in consideration of the difference in the number of occupants actually in the vehicle, it is easy to more appropriately adjust the ventilation state according to the number of occupants.

In the case of using the ventilation mode table T01 shown in FIG. 2, since a combination of the opening degrees of the plurality of windows can be selected by the plurality of ventilation modes M1 to M5, the strength of the wind flowing in each region of the vehicle compartment can be finely adjusted. Further, when any of the ventilation modes M1 to M5 is selected in consideration of the actual seating position of the occupant, it is possible to take care such that there is no occupant who feels uncomfortable due to the influence of strong wind or the like.

When any of the ventilation modes M1 to M5 is selected based on the outside air temperature information, it is possible to prevent the occupant from feeling uncomfortable due to ventilation such as too hot wind or too cold wind. When any of the ventilation modes M1 to M5 is selected based on the information on the vehicle speed of the own vehicle or the wind speed of the outside air, it is possible to prevent excessively strong wind from blowing through the window and causing the occupant feel uncomfortable.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, an in-vehicle ventilation system (100) includes a power window mechanism (11A to 11D) configured to open and close a window of a vehicle and a control unit (for example, central ECU 30) configured to control the power window mechanism. The control unit is further configured to acquire a first environmental information representing an environment inside the vehicle (for example, vehicle speed information i70) and a second environmental information representing an environment outside the vehicle (for example, outside air temperature information i23, wind speed information i60), automatically select, based on the first environmental information and the second environmental information, a specific ventilation adjustment mode suitable for at least one occupant of the vehicle out of a plurality of ventilation adjustment modes (for example, ventilation modes M1 to M5) and control the power window mechanism according to the selected ventilation adjustment mode (S82, S84, S86, S88, S89).

According to the in-vehicle ventilation system having the above configuration, since the control unit automatically controls the power window mechanism, ventilation can be performed by adjusting the opening degree of the window without the need for the occupant to perform a manual adjustment operation in situations such as while the vehicle is traveling. Moreover, since the ventilation adjustment mode is automatically selected based on the first environmental information and the second environmental information, it is possible to prevent the occupant from feeling uncomfortable.

The control unit may have the plurality of ventilation adjustment modes (for example, ventilation modes M1 to M5) in which opening degrees of one or more windows out of a plurality of windows of the vehicle are different from each other.

With this configuration, since the difference in the opening degree of the window can be properly used by selecting the plurality of ventilation adjustment modes, it is easy to appropriately adjust the ventilation strength and the strength of wind exposed to the occupants as necessary.

The in-vehicle ventilation system may further include an occupant detection unit (for example, seating sensors 12A to 12D) configured to detect presence and absence of an occupant on each of a plurality of seats of the vehicle. The control unit may be configured to grasp the number of occupants based on a detected state obtained by the occupant detection unit, and to reflect the number of occupants to the selection of the ventilation adjustment mode.

With this configuration, since the plurality of ventilation adjustment modes can be selected in consideration of the difference in the number of occupants actually in the vehicle, it is easy to more appropriately adjust the ventilation state according to the number of occupants.

The in-vehicle ventilation system may further include an occupant detection unit (for example, seating sensors 12A to 12D) configured to detect presence and absence of an occupant on each of a plurality of seats of the vehicle. The control unit may be configured to grasp the number of occupants and the seat on which the occupant sits based on a detected state obtained by the occupant detection unit, and to determine a combination of the opening degree of each of the plurality of windows in the vehicle according to the number of occupants and the seat on which the occupant sits.

With this configuration, when the ventilation adjustment mode is selected in consideration of the actual seating position of the occupant, it is possible to take care such that there is no occupant who feels uncomfortable due to the influence of strong wind or the like.

The control unit may be configured to acquire at least an information on a traveling speed of the vehicle (for example, vehicle speed information i70) as the first environmental information, and to acquire, as the second environmental information, a wind speed information of outside air (for example, wind speed information i60) and an outside air temperature information (for example, outside air temperature information i23) at a current location at which the vehicle is located.

With this configuration, it is possible to prevent the occupant from feeling uncomfortable due to ventilation such as too hot wind or too cold wind. When the ventilation adjustment mode is selected based on the information on the vehicle speed of the own vehicle or the wind speed of the outside air, it is possible to prevent excessively strong wind from blowing through the window and causing the occupant feel uncomfortable.

What is claimed is:

1. An in-vehicle ventilation system comprising:
   a power window mechanism configured to open and close a window of a vehicle;
   a control unit configured to control the power window mechanism; and
   an occupant detection unit configured to detect a presence of an occupant on each of a plurality of seats of the vehicle,
   wherein the control unit is further configured to:
      determine a position of one or more seats, among the plurality of seats of the vehicle, at which an occupant is present;
      acquire a first environmental information representing an environment inside the vehicle and a second environmental information representing an environment outside the vehicle;
      automatically select, based on the first environmental information, the second environmental information, and the position of the one or more seats at which the occupant is present, a specific ventilation adjustment mode suitable for at least one occupant of the vehicle out of a plurality of ventilation adjustment modes; and
      control the power window mechanism according to the selected ventilation adjustment mode,
   wherein each of the plurality of ventilation adjustment modes correspond to a combination of windows, among a plurality of windows included in the vehicle, to be opened by the power window mechanism, and
   wherein the control unit is further configured to:
      determine whether the one or more seats at which the occupant is present corresponds to a driver seat position;
      in a state in which the one or more seats corresponds to the driver seat position and an outside air temperature is within a certain range, windows at the driver seat position and a position in a rearward-diagonal relationship with the driver seat position are opened, and windows at remaining seat positions are closed; and
      in a state in which the one or more seats corresponds to the driver seat position and the outside air temperature is not within the certain range, windows at a front passenger seat position and a seat position in a rearward-diagonal relationship with the front passenger seat position are opened, and windows at remaining seat positions are closed.

2. The in-vehicle ventilation system according to claim 1, wherein the control unit has the plurality of ventilation adjustment modes in which opening degrees of one or more windows out of the plurality of windows of the vehicle are different from each other.

3. The in-vehicle ventilation system according to claim 1, wherein the control unit is configured to grasp a number of occupants based on a detected state obtained by the occupant detection unit, and to reflect the number of occupants to the selection of the ventilation adjustment mode.

4. The in-vehicle ventilation system according to claim 1, wherein the control unit is configured to acquire at least an information on a traveling speed of the vehicle as the first environmental information, and to acquire, as the second environmental information, a wind speed information of outside air and an outside air temperature information at a current location at which the vehicle is located.

5. The in-vehicle ventilation system according to claim 1, wherein each of the plurality of ventilation adjustment modes correspond to the combination of windows to be opened by the power window mechanism, and an opening degree for each window among the combination of windows to be opened.

6. The in-vehicle ventilation system according to claim 1, wherein the certain range is from 20° C.-28° C.

* * * * *